United States Patent
Lee

(10) Patent No.: US 10,222,883 B2
(45) Date of Patent: Mar. 5, 2019

(54) CONDUCTIVE FILM, TOUCH PANEL INCLUDING THE CONDUCTIVE FILM AND DISPLAY APPARATUS INCLUDING THE CONDUCTIVE FILM

(71) Applicant: LG Electronics Inc., Seoul (KR)

(72) Inventor: Weonwoong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 377 days.

(21) Appl. No.: 14/612,842

(22) Filed: Feb. 3, 2015

(65) Prior Publication Data

US 2016/0048228 A1 Feb. 18, 2016

(30) Foreign Application Priority Data

Aug. 14, 2014 (KR) .................. 10-2014-0105994
Sep. 19, 2014 (KR) .................. 10-2014-0125108

(51) Int. Cl.
| | |
|---|---|
| *G06F 3/041* | (2006.01) |
| *B32B 7/02* | (2006.01) |
| *B32B 3/30* | (2006.01) |
| *B32B 27/00* | (2006.01) |
| *B32B 7/00* | (2019.01) |

(Continued)

(52) U.S. Cl.
CPC ............... *G06F 3/041* (2013.01); *B32B 3/00* (2013.01); *B32B 3/26* (2013.01); *B32B 3/30* (2013.01); *B32B 7/00* (2013.01); *B32B 7/02* (2013.01); *B32B 7/04* (2013.01); *B32B 7/12* (2013.01); *B32B 27/00* (2013.01); *B32B 27/06* (2013.01);

(Continued)

(58) Field of Classification Search
CPC .... H05K 1/0306; H05K 1/0393; G06F 3/044;
G06F 3/041; G06F 2203/04111; G06F 2203/04103; B32B 7/00; B32B 7/02; B32B 7/04; B32B 7/12; B32B 27/00; B32B 27/06; B32B 3/00; B32B 3/26; B32B 3/30;

(Continued)

(56) References Cited

U.S. PATENT DOCUMENTS

| | | | | |
|---|---|---|---|---|
| 3,668,762 A | * | 6/1972 | Clark | ............... H05B 3/0002 156/251 |
| 9,666,111 B2 | * | 5/2017 | Yao | ........................ G06F 3/041 |

(Continued)

FOREIGN PATENT DOCUMENTS

| | | |
|---|---|---|
| CN | 102782624 A | 11/2012 |
| CN | 203179573 U | 9/2013 |

(Continued)

*Primary Examiner* — Bryan Earles
(74) *Attorney, Agent, or Firm* — Birch, Stewart, Kolasch & Birch, LLP

(57) ABSTRACT

A conductive film for use in a touch panel, and including a sensor electrode formed on a base member in a sensor area and a non-active area, the sensor electrode including nano-material conductors defining a network structure; an over-coating layer configured to cover the sensor electrode in the sensor area and the non-active area; and a wiring electrode formed on the over-coating layer in the non-active area. Further, the over-coating layer includes a first portion located between the sensor electrode and the wiring electrode and includes a recess, the recess including at least one of a perforation formed through the over-coating layer and a thin film portion providing the first portion with a smaller thickness than a remaining portion of the over-coating layer.

13 Claims, 9 Drawing Sheets

(51) Int. Cl.
*B32B 7/04* (2019.01)
*B32B 7/12* (2006.01)
*B32B 27/06* (2006.01)
*B32B 3/00* (2006.01)
*B32B 3/26* (2006.01)

(52) U.S. Cl.
CPC ....... *B32B 2255/00* (2013.01); *B32B 2307/20* (2013.01); *B32B 2307/202* (2013.01); *B32B 2457/00* (2013.01); *B32B 2457/20* (2013.01); *G06F 2203/04103* (2013.01); *G06F 2203/04111* (2013.01)

(58) Field of Classification Search
CPC ............ B32B 2255/00; B32B 2307/20; B32B 2307/202; B32B 2457/00; B32B 2457/20
See application file for complete search history.

(56) References Cited

U.S. PATENT DOCUMENTS

| | | |
|---|---|---|
| 2006/0046038 A1 | 3/2006 | Nakanishi et al. |
| 2009/0256817 A1 | 10/2009 | Perlin et al. |
| 2011/0175828 A1 | 7/2011 | Liu et al. |
| 2011/0242011 A1 | 10/2011 | Wu et al. |
| 2012/0113043 A1* | 5/2012 | Liu .................. G06F 3/044 345/174 |
| 2012/0327021 A1 | 12/2012 | Ryu et al. |
| 2012/0327023 A1 | 12/2012 | Hashimoto et al. |
| 2013/0113752 A1* | 5/2013 | Chang ............... G06F 3/044 345/174 |
| 2013/0127480 A1 | 5/2013 | Cuseo et al. |
| 2013/0255996 A1* | 10/2013 | Akieda ............ H05K 1/0298 174/250 |
| 2014/0290992 A1* | 10/2014 | Hur ................... G06F 3/044 174/257 |

FOREIGN PATENT DOCUMENTS

| | | |
|---|---|---|
| CN | 103907083 A | 7/2014 |
| TW | 201203064 A1 | 1/2012 |
| TW | 201243682 A1 | 11/2012 |
| TW | I412970 B | 10/2013 |
| TW | I420197 B | 12/2013 |
| WO | WO 2013/032302 A2 | 3/2013 |

* cited by examiner

CONDUCTIVE FILM, TOUCH PANEL INCLUDING THE CONDUCTIVE FILM AND DISPLAY APPARATUS INCLUDING THE CONDUCTIVE FILM

CROSS-REFERENCE TO RELATED APPLICATION

This application claims the priority benefit of Korean Patent Applications No. 10-2014-0105994, filed on Aug. 14, 2014 and No. 10-2014-0125108 filed on Sep. 19, 2014 in the Korean Intellectual Property Office, the disclosures of which are incorporated herein by reference.

BACKGROUND OF THE INVENTION

1. Field of the Invention

The present invention relates to conductive films and touch panels and display apparatuses including the conductive films.

2. Description of the Related Art

Recently, conductive films including transparent conductive thin films have been applied to various electronic apparatuses, such as displays, touch panels and the like. Such a conductive film is formed by forming a transparent conductive (low resistance) thin film on a plastic substrate and patterning the transparent conductive thin film.

The related art transparent conductive thin film is generally formed via vacuum deposition of a material such as indium tin oxide. However, use of indium tin oxide causes high material costs and the vacuum deposition causes low productivity. In addition, indium tin oxide is not flexible and thus application thereof to flexible electronic apparatuses is difficult. Moreover, high resistance of indium tin oxide makes it difficult to apply indium tin oxide to large-area electronic apparatuses.

SUMMARY OF THE INVENTION

Therefore, the present invention has been made in view of the above problems, and it is an object of the present invention to provide conductive films which have excellent properties and may be manufactured by simple processes and applied to touch panels, touch panels including the conductive films and display apparatuses including the conductive films.

In accordance with one embodiment, the present invention provides a conductive film for use in a touch panel including a base member having a sensor area and a non-active area defined therein, a sensor electrode formed on the base member in the sensor area and the non-active area, the sensor electrode including nano-material conductors defining a network structure, an over-coating layer configured to cover the sensor electrode in the sensor area and the non-active area and a wiring electrode formed on the over-coating layer in the non-active area, the wiring electrode including a pad portion electrically connected to the sensor electrode and a wiring portion connected to the pad portion, wherein the over-coating layer includes a first portion located between the sensor electrode and the wiring electrode and provided with a recess, the recess including at least one of a perforation formed through the over-coating layer and a thin film portion providing the first portion with a smaller thickness than the remaining portion of the over-coating layer.

In accordance with another embodiment, the present invention provides a touch panel including the above-described conductive film for the touch panel and a sensor electrode spaced apart from the sensor electrode of the conductive film and configured to extend in a direction crossing the sensor electrode of the conductive film.

In accordance with a further embodiment, the present invention provides a display apparatus including the above-described touch panel and a display panel located at the rear of the touch panel to display an image.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
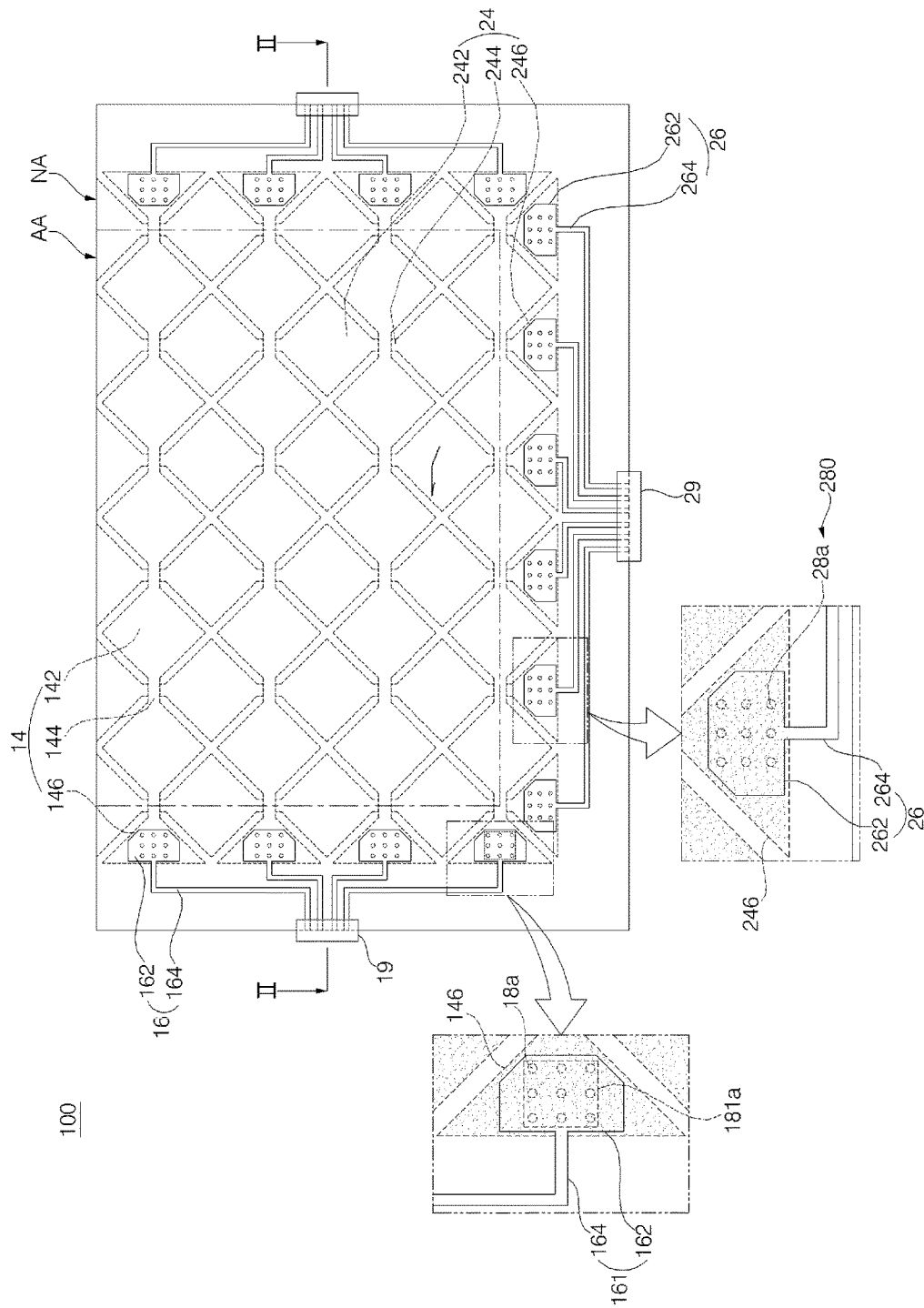
FIG. 1 is a plan view showing a touch panel according to one embodiment of the present invention.

Hereinafter, embodiments of the present invention will be described in detail with reference to the accompanying drawings. However, the present invention is not limited to these embodiments and various alterations thereof are possible.

In the drawings, parts not related to description are illustrated for clear and brief description of the present invention, and the same reference numerals are used throughout the specification to refer to the same or considerably similar parts. In addition, thicknesses, widths and the like are exaggerated or reduced in the drawings for clarity of description and thicknesses, widths and the like of the present invention are not limited to the illustration of the drawings.

In addition, throughout this specification, when one element is referred to as "comprising" another element, the term "comprising" specifies presence of another element but does not preclude presence of other additional elements, unless context clearly indicates otherwise. Additionally, when one element such as a layer, a film, a region or a plate is referred to as being "on" another element, the one element may be directly on the another element, and one or more intervening elements may also be present. In contrast, when one element such as a layer, a film, a region or a plate is referred to as being "directly on" another element, one or more intervening elements are not present.

Hereinafter, touch panels and methods of manufacturing the touch panels as well as conductive films included in the touch panels and methods of manufacturing the conductive films according to embodiments of the present invention will be described in detail with reference to the accompanying drawings. In addition, display apparatuses including the touch panels according to embodiments of the present invention will be described in detail.

Figure 2:
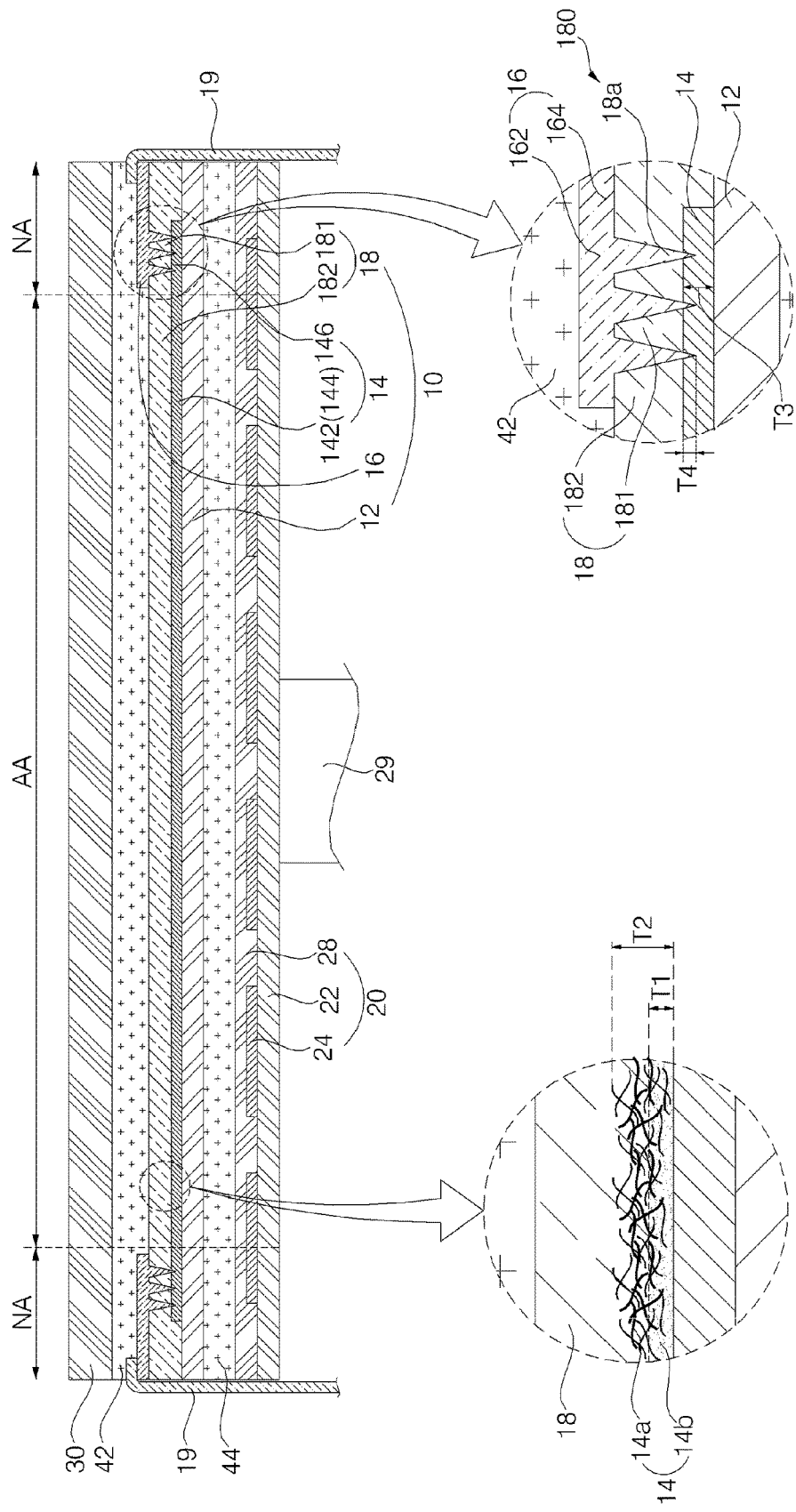
FIG. 2 is a sectional view taken along line II-II of FIG. 1.

FIG. 1 is a plan view showing a touch panel according to one embodiment of the present invention, and FIG. 2 is a sectional view taken along line II-II of FIG. 1. For clear and brief illustration, in FIG. 1, first and second sensor electrodes 14 and 24 and first and second wiring electrodes 16 and 26 are illustrated in priority, without illustration of a cover substrate 30, first and second transparent adhesive layers 42 and 44, first and second base members 12 and 22, first and second over-coating layers 18 and 28 and the like.

As exemplarily shown in FIGS. 1 and 2, a touch panel 100 according to the present embodiment includes an active area AA and a non-active area NA located around the active area AA. The active area AA is an area where sensor electrodes 14 and 24 are arranged to sense touch by the user's hand or an input device, such as a stylus pen or the like. The non-active area NA is an area where flexible printed circuit boards (FPCBs) 19 and 29 that are connected to an external circuit (for example, a touch control unit of a display apparatus to control the touch panel 100) for transmission of information sensed in the active area AA, wiring electrodes 16 and 26 connected to the FPCBs 19 and 29 and the like are arranged. In addition, a bezel, a black printed layer or the like, which is used to physically secure various layers, elements and the like constituting the touch panel 100 and to cover these and various other elements arranged in the non-active area NA, may be arranged in the non-active area NA.

The touch panel 100 according to the present embodiment includes a first conductive film 10 having a first sensor electrode 14 and a first wiring electrode 16 connected to the first sensor electrode 14, a second sensor electrode 24 located so as to be insulated from the first sensor electrode 14, and a second wiring electrode 26 connected to the second sensor electrode 24.

In the present embodiment, the second sensor electrode 24 and the second wiring electrode 26 are disposed on a second base member 22 to constitute a second conductive film 20. In addition, the touch panel 100 further includes a cover substrate 30, a first transparent adhesive layer 42 to attach the cover substrate 30 and the first conductive film 10 to each other, and a second transparent adhesive layer 44 to attach the first conductive film 10 and the second conductive film 20 to each other. This will be described below in more detail.

The cover substrate 30 may be formed of a material that may protect the touch panel 100 from external shock and allow light to be transmitted through the touch panel 100. For example, the cover substrate 30 may be formed of glass. However, the present invention is not limited thereto and various alterations with regard to a material of the cover substrate 30 and the like are possible.

The first transparent adhesive layer 42 is interposed between the cover substrate 30 and the first conductive film 10 to bond them to each other, and the second transparent adhesive layer 44 is interposed between the first conductive film 10 and the second conductive film 20 to bond them to each other. Through the first and second transparent adhesive layers 42 and 44, a plurality of layers constituting the touch panel 100 can be integrally coupled to one another. In this instance, the first and second conductive films 10 and 20 are respectively bonded to the first and/or second transparent adhesive layers 42 and 44 after the first and second flexible printed circuit boards 19 and 29 are attached to the first and second conductive films 10 and 20.

The first and second transparent adhesive layers 42 and 44 may be formed of a material that has adhesion to allow layers located at both sides thereof to be attached thereto and also has light transmittance, and more particularly, may be formed of an optically clear adhesive (OCA). The optically clear adhesive has excellent adhesive force as well as high moisture tolerance, heat resistance, foaming-ability and processibility and prevents deterioration of the first and/or second sensor electrodes 14 and/or 24 and the first and/or second wiring electrodes 16 and/or 26. The first and second transparent adhesive layers 42 and 44 may be formed of any of various known optically clear adhesives.

The first and second conductive films 10 and 20 are disposed on the cover substrate 30 (on a lower surface of the cover substrate 30 in the drawing). In the present embodiment, although the first sensor electrode 14 is formed on the first base member 12 to constitute the first conductive film 10 and the second sensor electrode 24 is formed on the second base member 22 to constitute the second conductive film 20, the present invention is not limited thereto and various alterations are possible. This will be described in more detail later with reference to FIGS. 8 to 10.

The first conductive film 10 includes the first base member 12, the first sensor electrode 14 formed on the first base member 12, a first over-coating layer 18 covering the first sensor electrode 14, and the first wiring electrode 16 formed on the first over-coating layer 18 and electrically connected to the first sensor electrode 14 at the non-active area NA.

The first base member 12 may take the form of a film, sheet, substrate or the like and be formed of a material that has light transmittance and insulation and maintains mechanical strength of the first conductive film 10. The first base member 12 may be formed of at least one of polyethylene, polypropylene, polyethylene terephthalate, polyethylene-2,6-naphthalate, polypropylene terephthalate, polyimide, polyamideimide, polyethersulfone, polyetheretherketon, polycarbonate, polyarylate, cellulose propionate, polyvinyl chloride, polyvinylidene chloride, polyvinyl alcohol, polyetherimide, polyphenylene sulfide, polyphenylene oxide, polystyrene and the like. For example, the first base member 12 may be formed of polyethylene terephthalate, although the present invention is not limited thereto, and the first base member 12 may be formed of any of various other materials except for the aforementioned materials.

The first sensor electrode 14, which is formed on the first base member 12, includes first sensor portions 142 and first connection portions 144 respectively connecting the neighboring first sensor portions 142 to each other, the first sensor portions 142 and the first connection portions 144 being arranged in the active area AA, and first wiring connection portions 146 extending from the first sensor portions 142 or the first connection portions 144 located in the active area AA so as to be located in the non-active area NA.

The first sensor portions 142 serve to substantially sense touch by an input device or the user's finger. The drawing illustrates that the first sensor portions 142 have a diamond shape and occupy a wide area in the active area AA, along with second sensor portions 242 of the second sensor electrode 24, to effectively sense touch. However, the present invention is not limited thereto and the first sensor portions 142 may have any of various other shapes, such as polygonal shapes including triangular and rectangular shapes, a circular shape, an oval shape and the like. The first connection portions 144 serve to connect the first sensor portions 142 to one another in a first direction (a horizontal direction of the drawing). As such, the first sensor electrode 14 can extend by a long length in the first direction within the active area AA.

The first wiring connection portions 146 extend from the first sensor portions 142 or the first connection portions 144 into the non-active area NA and have some portions directly connected or electrically connected to the first wiring electrode 16 (more particularly, first pad portions 162). The drawing illustrates that each first wiring connection portion 146 is part of the diamond shape of the first sensor portion 142. Through this configuration, the first wiring connection portions 146 can have a pattern similar to that of the first sensor portions 142 and have a relatively great width or area, which ensures easy connection between the first wiring connection portions 146 and the first pad portions 162. In this instance, the first wiring connection portions 146 are stacked on the first wiring electrode 16 (more particularly, the first pad portions 162) for stable connection with the first pad portions 162. This will be described below in more detail upon description of the first wiring electrode 16.

In the present embodiment, the first sensor electrode 14 is formed of a transparent and conductive light transmitting material. For example, the first sensor electrode 14 may include nano-material conductors 14a having a network structure (for example, metal nano-wires, such as silver nano-wires, copper nano-wires, platinum nano-wires or the like). Here, the network structure is a structure in which neighboring nano-material conductors, such as nano-wires, are entangled at contact points thereof to form a net, a mesh or the like, thereby achieving electrical connection via the contact points.

Because the first sensor electrode 14 includes the transparent and conductive nano-material conductors 14a, the first sensor electrode 14 can be formed via wet coating that has lower process costs than deposition. That is, the first sensor electrode 14 can be formed by wet coating a paste, ink, mixture, solution or the like including nano-material conductors, for example, nano-wires to form an electrode layer and patterning the electrode layer. In this instance, a concentration of the nano-material conductors 14a included in the solution, mixture, paste or the like that is used in wet coating is very low (for example, 1% or less). Thus, the resulting first sensor electrode 14 can be fabricated with reduced cost and result in enhanced productivity.

In addition, the first sensor electrode 14 including the nano-material conductors 14a can achieve low resistance and excellent electrical properties while being capable of transmitting light. For example, surfaces of silver (Ag) nano particles may have various crystal faces, thus easily inducing anisotropic growth and enabling easy production of silver nano-wires. The silver nano-wires may have a resistance of about 10 $\Omega/m^2$ to 400 $\Omega/m^2$, which gives the first sensor electrode 14 a low resistance of about 10 $\Omega/m^2$ to 150 $\Omega/m^2$. As such, the first sensor electrode 14 can have any of various resistances. In particular, the first sensor electrode 14 can exhibit higher electrical conductivity than indium tin oxide that has a resistance of about 200 $\Omega/m^2$ to 400 $\Omega/m^2$. In addition, the silver nano-wires can have a higher light transmittance (for example, 90% or more) than indium tin oxide. In addition, the silver nano-wires can be flexible and thus suitable for use in flexible apparatuses and supply of this material is stable.

As described above, the nano-wires (in particular, silver nano-wires) may have a radius of 10 nm to 60 nm and a long axis length of 10 µm to 200 µm, for example. Within this range, the silver nano-wires can have a high aspect ratio (for example, 1:300 to 1:20000), thus forming a network structure and effectively shielding the first sensor electrode 14. However, the present invention is not limited thereto and a radius, a long axis length and an aspect ratio of nano-wires may vary.

In the present embodiment, as a result of the first sensor electrode 14 including the nano-material conductors 14a having a network structure, reduced material costs and various improved properties are accomplished.

The first sensor electrode 14, which takes the form of a conductive layer including the nano-material conductors 14a having a network structure as described above, may be configured so the nano-material conductors 14a are present in a layer having a uniform thickness, or voids are present between the nano-material conductors 14a. Indeed, the first sensor electrode 14 can be formed via application of a mixture of the nano-material conductors 14a and an extremely small amount of solvent, binder and the like. As such, the first sensor electrode 14 includes a residual portion 14b formed of the solvent, binder and the like, and the residual portion 14b has a relatively small first thickness T1 such that the conductors 14a extend out of the residual portion 14b. As such, a network structure defined by the conductors 14a can have a relatively large second thickness T2. In the following description, note that a thickness of the first sensor electrode 14 does not refer to the first thickness T1 of the residual portion 14b, but refers to the total thickness of the residual portion 14b and a layer in which the conductors 14a protruding upward from the residual portion 14b are present, i.e., the second thickness T2.

The thickness of the first sensor electrode 14 may vary to different values according to a size of the touch panel 100, a required resistance value, and a material of the first sensor electrode 14. In this instance, the thickness of the first sensor electrode 14 can be minimized when the first sensor electrode 14 includes metal nano-wires having a network structure. For example, the first sensor electrode 14 can have a thickness of 50 nm to 350 nm because this thickness ensures easy formation of the first sensor electrode 14 having a desired resistance. However, the present invention is not limited thereto, and the thickness of the first sensor electrode 14 may have any of various other values.

The first over-coating layer 18, which covers the first sensor electrode 14 on the first base member 12, serves to physically and chemically protect the first sensor electrode 14. More specifically, the first over-coating layer 18 is configured to enclose the entire conductors 14a extending out of the residual portion 14b to prevent damage to the conductors 14a or oxidation of the conductors 14a. More specifically, the first over-coating layer 18 can physically protect the conductors 14a protruding upward from the residual portion 14b to prevent the conductors 14a from being bent by external force or the like.

In addition, since the conductors 14a may be oxidized when exposed to outside air for a long time, thus exhibiting reduced electrical conductivity, the first over-coating layer 18 may be formed to cover the conductors 14a. In the present embodiment, because the first sensor electrode 14 includes the nano-material conductors 14a having a network structure, the first over-coating layer 18 capable of improving physical stability of the conductors 14a and preventing oxidation of the conductors 14a is provided.

For example, some of the first over-coating layer 18 may be introduced into voids between the conductors 14a to fill the voids, and some of the first over-coating layer 18 may be present above the conductors 14a. Differently from the present embodiment, even when the conductors 14a are included in the residual portion 14a rather than protruding upward of the residual portion 14b, the first over-coating layer 18 may be used to prevent the conductors 14a from being oxidized by outside air entering the residual portion 14a. Thus, the first over-coating layer 18 may be formed to directly come into contact with the first sensor electrode 14 or the conductors 14a.

Further, the first over-coating layer 18 may be entirely formed on the first base member 12 to cover the first sensor electrode 14. Here, the term "entirely formed" may refer to not only perfect formation without empty regions, but also formation with inevitable omission of some portions.

The first over-coating layer 18 as described above may be formed of a resin. For example, the first over-coating layer 18 may be formed of an acrylic resin. However, the present invention is not limited thereto, and the first over-coating layer 18 may be formed of any of various other materials. In addition, the first over-coating layer 18 may be formed to cover the entire first sensor electrode 14 via any of various coating methods.

For example, the first over-coating layer 18 may have a thickness of 50 nm to 200 nm. When the thickness of the first over-coating layer 18 is below 50 nm, the first over-coating layer 18 may fail to sufficiently prevent oxidation of the conductors 14a. When the thickness of the first over-coating layer 18 exceeds 200 nm, material costs are increased. However, the present invention is not limited thereto and the thickness of the first over-coating layer 18 may include various other values.

The drawings and the above-described embodiment illustrate that the residual portion 14b of the first sensor electrode 14 and the first over-coating layer 18 are configured as different layers. However, the present invention is not limited thereto. In another embodiment, by applying, for example, ink that is a mixture of constituent materials of the conductors 14a and the residual portion 14b of the first sensor electrode 14 and the first over-coating layer 18, the conductors 14a may be included in a single first over-coating layer 18. Various other alterations are also possible.

Provided on the first over-coating layer 18 in the non-active area NA is the first wiring electrode 16 connected to the first wiring connection portions 146. More specifically, the first wiring electrode 16 includes the first pad portions 162 that are stacked on the first wiring connection portions 146 with the first over-coating layer 18 interposed therebetween to thereby be electrically connected to the first wiring connection portions 146, and first wiring portions 164 extending outward from the first pad portions 162. In this instance, a width of the first pad portions 162 may be greater than a width of the first wiring portions 164 to achieve stable connection between the first pad portions 162 and the first wiring connection portions 146.

As described above, the first over-coating layer 18 may physically protect the first sensor electrode 14, which includes the nano-material conductors 14a having a network structure, and prevent problems due to oxidation of the conductors 14a. Accordingly, the first over-coating layer 18 of the present embodiment is located over the first sensor portions 142 and the first connection portions 144 of the first sensor electrode 14 and over the first wiring connection portions 146 located in the non-active area NA.

As such, in the present embodiment, because the first over-coating layer 18 is located between the first sensor electrode 14 and the first wiring electrode 16 (more particularly, between the first wiring connection portions 146 and the first pad portions 162), the first over-coating layer 18 may cause deterioration of connection between the first sensor electrode 14 and the first wiring electrode 16. This is because, although the first over-coating layer 18 has a small thickness and does not interrupt an electrical connection between the first sensor electrode 14 and the first wiring electrode 16, the first over-coating layer 18 may be formed of an insulation resin or the like, thus having an effect on electrical connection.

For clarity of description, hereinafter, portions of the first over-coating layer 18 located between the first wiring connection portions 146 and the first pad portions 162 (for example, located between the first wiring connection portions 146 and the first pad portions 162 so as to come into contact therewith) will be referred to as first portions 181 and the other portions of the first over-coating layer 18 covering the first sensor portions 142 except for the first portions 181 will be referred to as second portions 182. While the second portions 182 of the first over-coating layer 18 serve to improve properties of the first sensor portions 142 as described above and the first portions 181 of the first over-coating layer 18 serve to improve properties of the first wiring connection portions 146, the first portions 181 may cause deterioration of electrical connection between the first wiring connection portions 146 and the first pad portions 162.

In consideration of this problem, in the present embodiment, each of the first portions 181 includes perforations 18a formed in some positions thereof to allow the first wiring connection portion 146 to come into contact with and be connected to the first pad portion 162. Since the first portion 181 serves to improve properties of the first wiring connection portion 146 as described above, it is preferable that a region of the first portion 181 between the first wiring connection portion 146 and the first pad portion 162, remaining after forming the perforations 18a in some positions, cover the first wiring connection portion 146 to prevent, for example, oxidation of the conductors 14a in the first wiring connection portion 146.

Figure 5:
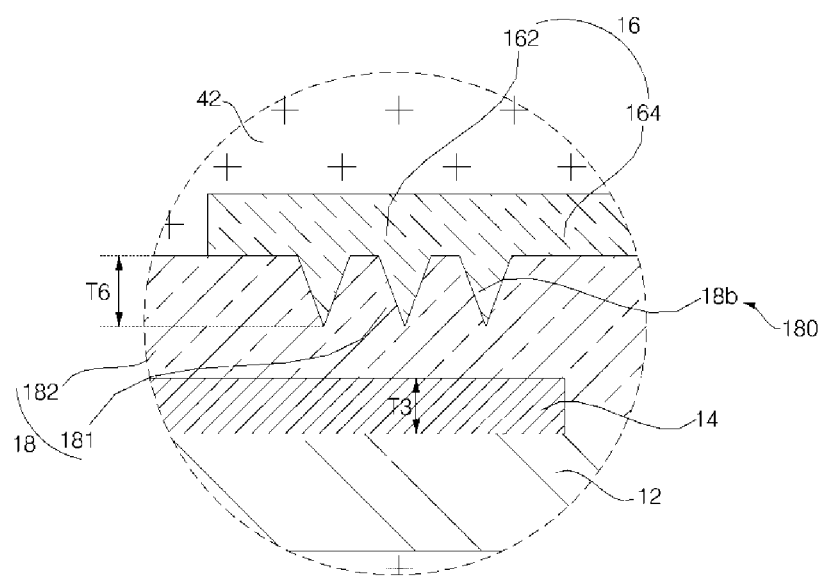
FIG. 5 is a sectional view showing part of a touch panel according to another alternative embodiment of the present invention.

While the present embodiment illustrates the perforations 18a as being formed through the first portion 181 in some positions of the first portion 181, a region of the first portion 181 may have a smaller thickness than the remaining region to form thin film portions (see reference numeral 18b of FIG. 5). This will be described below in detail with reference to FIG. 5.

Assuming that large-area perforations 18a are formed in the first over-coating layer 18 covering the first sensor electrode 14, for example, oxidation of the first sensor electrode 14 (more particularly, the first wiring connection portion 146) may occur, causing deterioration in properties of the first sensor electrode 14. In consideration of this problem, in the present embodiment, a plurality of small-area perforations 18a may be formed in each first portion 181 located between one first wiring connection portion 146 and one first pad portion 162 connected to the first wiring connection portion 146. In this way, the first over-coating layer 18 can accomplish stable connection between the first wiring connection portions 146 and the first pad portions 162 while still providing the first sensor electrode 14 with improved properties.

For example, 4 to 64 perforations 18a may be formed in each first portion 181. When the number of perforations 18a formed in each first portion 181 is below 4, electrical connection may be insufficient. When the number of perforations 18a exceeds 64, an area of the first over-coating layer 18 in the first portion 181 is excessively small, which may make it difficult for the first over-coating layer 18 to improve properties of the first wiring connection portion 146. However, the present invention is not limited thereto, and providing each first portion 181 with two or more perforations 18a may be sufficient.

In this instance, the perforations 18a may have any of various arrangements in plan. For example, the perforations 18a may be arranged in a plurality of columns and a plurality of rows into a matrix in each first portion 181. This arrangement can ensure uniform and dense connection between the first wiring connection portion 146 and the first pad portion 162 and increase the probability of connection between the nano-material conductors 14a of the first wiring connection portion 146 and the first pad portion 162.

In addition, this regular arrangement of the perforations 18a can reduce shock applied by the first wiring connection portion 146 during formation of the perforations 18a, thereby minimizing any damage to the nano-material conductors 14a. This is because the perforations 18a are formed by applying pressure to the first portion 181 of the first over-coating layer 18. This formation of the perforations 18a will be described below in more detail.

For example, the perforations 18a in each first portion 181 can be arranged in matrix having 2 to 8 columns and 2 to 8 rows. This matrix arrangement serves to maximize electrical connection by the perforations 18a as well as effects acquired by the first portion 181. More specifically, the perforations 18a can be arranged in matrix having 3 to 5 columns and 3 to 5 rows. However, the present invention is not limited thereto and various other alterations are possible.

The columns or rows of the perforations 18a can be arranged parallel to an edge of the first wiring connection portion 146, but not be arranged parallel to the edge of the first wiring connection portion 146. Various other arrangements are also possible.

Here, an area of a zone 181a (see FIG. 1) where the perforations 18a are arranged (i.e. an area of an imaginary zone defined by interconnecting outermost peripheral perforations 18a among all the perforations 18a) may be within a range of 20% to 80% of an area of the entire first wiring connection portion 146 or the entire first pad portion 162. When the area of the zone 181a is below 20%, an area occupied by the perforations 18a is excessively small, which may cause insufficient electrical connection between the first wiring connection portion 146 and the first pad portion 162. When the area of the zone 181a exceeds 80%, an area occupied by the perforations 18a is excessively great, which may necessitate increase in alignment accuracy with respect to the first wiring connection portion 146. This is because reduction in alignment accuracy may cause the perforations 18a to be formed in unwanted positions.

In this instance, a length or width of the zone 181a where the perforations 18a are arranged may be within a range of 15% to 85% of a length or width of the first pad portion 162. When the length or width of the zone 181a is below 15%, an area occupied by the perforations 18a is excessively small, which may cause insufficient electrical connection between the first wiring connection portion 146 and the first pad portion 162.

When the length or width of the zone 181a exceeds 85%, an area occupied by the perforations 18a is excessively large, which may necessitate increase in alignment accuracy with respect to the first wiring connection portion 146. This is because the reduction in alignment accuracy may cause the perforations 18a to be formed in unwanted positions rather than being formed in the first wiring connection portion 146. However, the present invention is not limited thereto, and the area and the length or width of the zone 181a can include various other values.

A total area of the perforations 18a (a sum value of areas of all of the perforations 18a) may be within a range of 30% to 50% of an area of the zone 181a where the perforations 18a are arranged. When the area of the perforations 18a is below 30%, the area of the perforations 18a is not sufficient, and this may cause insufficient electrical connection between the first wiring connection portion 146 and the first pad portion 162. When the area of the perforations 18a exceeds 50%, an area of the first over-coating layer 18 in each first portion 181 is reduced, and this may cause deterioration in properties of the first wiring connection portion 146.

For example, a width or diameter of each perforation 18a may be within a range of 10 µm to 500 µm. Here, the largest width or diameter of the perforation 18a, or a long axis length of the perforation 18a may be determined as a width or diameter of the perforation 18a. When a width or diameter of each perforation 18a is below 10 µm, electrical connection may be inefficient. When a width or diameter of each perforation 18a exceeds 500 µm, an area of the first over-coating layer 18 in each first portion 181 is reduced, which may cause deterioration in properties of the first wiring connection portion 146. To achieve improved electrical connection and properties of the first wiring connection portion 146, a width or diameter of the perforation 18a may be within a range of 10 µm to 100 µm. However, the present invention is not limited thereto, and a width or diameter of the perforation 18a may vary to various other values.

In addition, a distance between the neighboring perforations 18a may be within a range of 0.1 mm to 0.9 mm. Here, the shortest distance between the neighboring perforations 18a may be determined as a distance between the neighboring perforations 18a. When a distance between the neighboring perforations 18a is below 0.1 mm, an area of the first over-coating layer 18 in each first portion 181 is reduced, which may cause deterioration in properties of the first wiring connection portion 146. When a distance between the neighboring perforations 18a exceeds 0.9 mm, electrical connection may be inefficient. However, the present invention is not limited thereto, and a distance between the perforations 18a may vary to various other values.

Each perforation 18a may have any of various shapes, such as polygonal shapes including rectangular and triangular shapes, a circular shape, an oval shape, a wedge shape and the like.

Figure 3:
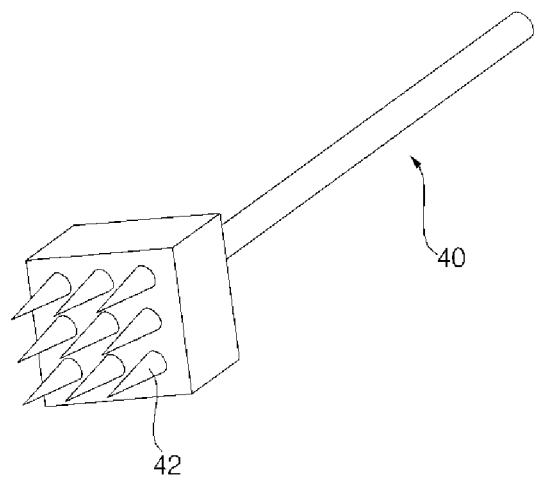
FIG. 3 is a perspective view showing one example of a pressure tool to form recesses in the touch panel shown in FIG. 1.

In the present embodiment, the perforations 18a may be formed by placing a pressure tool 40 that includes pressure pieces 42 with pointed tips, such as pins, as exemplarily shown in FIG. 3 on the first over-coating layer 18 and then applying pressure to cause breakage of or damage to the first over-coating layer 18. Thereby, the perforations 18a may take the form of pressurized spots (i.e., cracks generated by pressure or recesses or indentations by pressure). This is possible because the first over-coating layer 18 has a small thickness. Through formation of the perforations 18a using this method, the perforations 18a can be formed without complicated patterning, such as etching using a mask or the like.

As a result of forming the perforations 18a using the pressure tool 40 having the pressure pieces 42 with the pointed tips, the perforation 18a may have a smaller area at a position close to the first base member 12 than that at an opposite position (i.e., a position in a surface (an outer surface) of the first over-coating layer 18 or distant from the first base member 12 and the first electrode 14). This is because the first over-coating layer 18 is first formed and then the perforation 18a is formed by applying pressure to the surface of the first over-coating layer 18 using the pressure tool 40. For example, as an area of the perforation 18a may gradually increase with increasing distance from the first base member 12, the perforation 18a may have a notch-shaped cross section (e.g., a V-shaped cross section).

A lateral surface of the perforation 18a may have a greater surface roughness than a surface roughness of the surface of the first over-coating layer 18. When the perforation 18a is formed by applying pressure to the first over-coating layer 18 to cause breakage of or damage to the first over-coating layer 18 as described above, the lateral surface of the perforation 18a may have a considerably great surface roughness due to the pressure applied during formation of the perforation 18a. For example, a surface roughness of the lateral surface of the perforation 18a may be 10 nm or more (for example, within a range of 10 nm to 10 μm), and a surface roughness of the surface of the first over-coating layer 18 may be below 10 nm.

However, a surface roughness of the lateral surface of the perforation 18a may vary according to process conditions and the like upon formation of the perforation 18a, and a surface roughness of the surface of the first over-coating layer 18 may vary according to a constituent material, a forming method and the like of the first over-coating layer 18. Thus, the present invention is not limited to the aforementioned numerical values.

The perforation 18a may be formed through the first over-coating layer 18 such that a tip end of the perforation 18a (i.e., an end of the perforation 18a close to the first base member 12) comes into contact with the first wiring connection portion 146. In this instance, as shown in the drawing, the perforation 18a extends to the first wiring connection portion 146 so as to increase the probability of the first pad portion 162 coming into contact with the nano-material conductors 14a in the first sensor electrode 14 (more particularly, in the first wiring connection portion 146). That is, the perforation 18a can be formed in the first over-coating layer 18 as well as the first wiring connection portion 146. Thereby, the first pad portion 162 filling the perforation 18a may reach inside the first wiring connection portion 146, thus achieving improved connection with the nano-material conductors 14a of the first wiring connection portion 146. For example, a depth T4 of the perforation 18a formed in the first wiring connection portion 146 may be within a range of 40% to 100% of a thickness T3 of the first wiring connection portion 146. This results in an improved connection between the first wiring connection portion 146 and the first pad portion 162.

Figure 4:
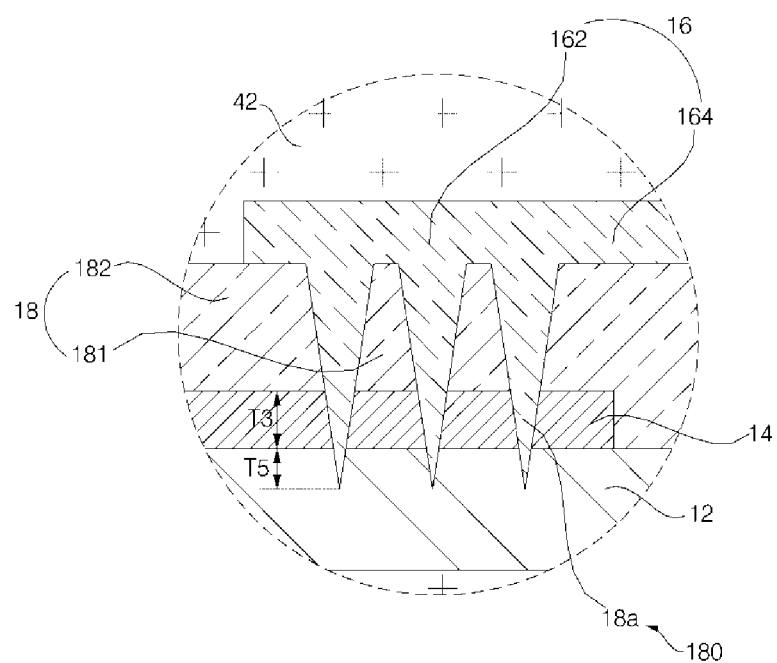
FIG. 4 is a sectional view showing part of a touch panel according to one alternative embodiment of the present invention.

However, the present invention is not limited thereto and various alterations are possible. Thus, the depth T4 of the perforation 18a formed in the first wiring connection portion 146 may be 40% or less of the thickness T3 of the first wiring connection portion 146. In addition, a position of the perforation 18a may be altered. This will be described below with reference to FIGS. 4 and 5. FIGS. 4 and 5 are sectional views showing the perforations 18a of the first conductive film 10 according to alternative embodiments of the present invention, and show a portion corresponding to the enlarged circle at the right of FIG. 2.

As exemplarily shown in FIG. 4, the perforations 18a may extend to the first base member 12 as well as the first over-coating layer 18 and the first wiring connection portion 146. That is, the perforations 18a may extend through the first over-coating layer 18 and the first wiring connection portion 146 and be formed in a region of the first base member 12. As such, the perforations 18a may be sufficiently formed throughout the first over-coating layer 18, which may stably maximize connection between the first wiring connection portion 146 and the first pad portion 162. In this instance, when the perforations 18a are formed in the first base member 12 by an excessively great depth, structural stability of the first base member 12 may be deteriorated. Therefore, a depth of the perforation 18a formed in the first wiring connection portion 146 (i.e., a sum of a thickness T3 of the wiring connection portion 146 and a depth T5 of the perforation 18a in the first base member 12) may be within 110% of the thickness T3 of the first wiring connection portion 146. That is, the depth T5 of the perforation 18a in the first base member 12 may be within 10% of the thickness T3 of the first wiring connection portion 146. However, the present invention is not limited thereto, and various alterations are possible.

In another example, as exemplarily shown in FIG. 5, the thin film portions 18b rather than the perforations 18a are present in a region of the first over-coating layer 18. That is, provided in the first portion 181 may be only the thin film portions 18b that do not penetrate the first over-coating layer 18 and cause the first over-coating layer 18 to have a smaller thickness in a corresponding region than that of the remaining region thereof. The thin film portions 18b to provide the first over-coating layer 18 with a reduced thickness allow the first over-coating layer 18 to be present in the entire first portion 181. As such, the entire first wiring connection portion 146 is covered with the first over-coating layer 18, which can maximize improvement in the properties of the first wiring connection portion 146 by the first over-coating layer 18. In addition, the thin film portions 18b can achieve a reduced distance between the first wiring connection portion 146 and the first pad portion 162, which improves electrical connection between the first wiring connection portion 146 and the first pad portion 162.

A depth T6 of the thin film portions 18b may be 20% or more (for example, 50% or more) of the thickness T3 of the first wiring connection portion 146. When the depth T6 of the thin film portions 18b is smaller than the aforementioned value, the thin film portions 18b may fail to exhibit sufficient effects, although the present invention is not limited thereto.

The above description related to the perforations 18b may be directly applied to the number, arrangement and plan shape of the thin film portions 18b, an area of a zone where the thin film portions 18b are arranged, a total area of the thin film portions 18b, a width or diameter of the thin film portions 18b, a distance between the thin film portions 18b, a method of forming the thin film portions 18b, a cross sectional shape of the thin film portions 18b and the like and thus a detailed description related thereto is omitted.

As described above, in the present embodiment, recesses 180 including the perforations 18a formed through the first over-coating layer 18 or the thin film portions 18b acquired by partially removing the first over-coating layer 18 in a thickness direction thereof may be formed in the first portion 181 of the first over-coating layer 18. That is, the recesses refer to any recessed portions having a smaller thickness than that of the remaining portion of the first over-coating layer 18 or through-holes formed in the first over-coating layer 18 and are not limited in terms of plan shape, arrangement and the like.

In the above-description and illustration, the recesses 180 have been described as including the perforations 18a or the thin film portions 18b. However, the present invention is not limited thereto, and the recesses 180 located between one first wiring connection portion 146 and one first pad portion 162 corresponding to the first wiring connection portion 146 may include both the perforations 18a and the thin film portions 18b. Various other alterations are also possible.

Referring again to FIGS. 1 and 2, the first wiring electrode 16 may be formed of a highly conductive metal, and the first pad portion 162 may be formed as a material of the first pad portion 162 fills the perforations 18a (or the thin film portions 18b). The first pad portion 162 may be stacked on the first wiring connection portion 146 with the first over-coating layer 18 (more particularly, the first portion 181) interposed therebetween and may have a relatively great width or area for connection with the first wiring connection portion 146.

In addition, the present embodiment illustrates that the first pad portion 162 has a smaller area than the first wiring connection portion 146 and the entire first pad portion 162 overlaps the first wiring connection portion 146. For example, the drawing illustrates that the first wiring connection portion 146 has a shape corresponding to a half of the first sensor portion 142, i.e., an approximately trapezoidal shape or equilateral triangular shape and the first pad portion 162 has an approximately octagonal shape suitable to be included in the first wiring connection portion 146. This minimizes an area of the first pad portion 162, thereby achieving reduced material costs and the like.

Figure 6:
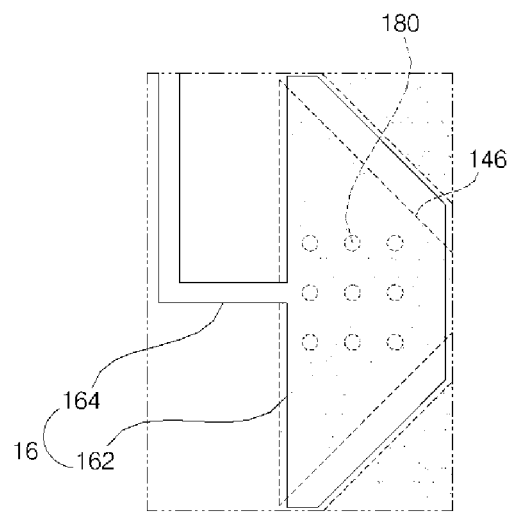
FIG. 6 is a plan view showing part of a touch panel according to still another alternative embodiment of the present invention.
Figure 7:
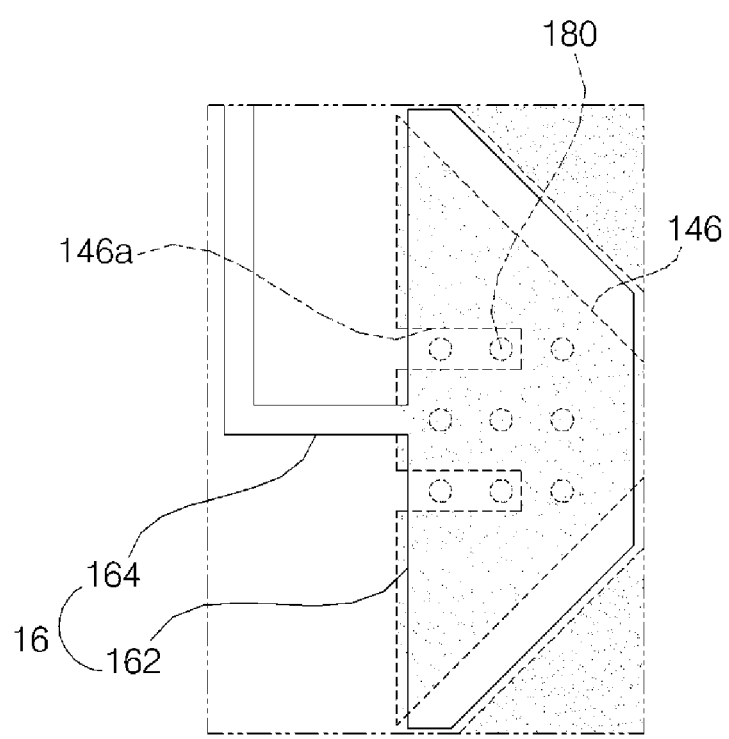
FIG. 7 is a plan view showing part of a touch panel according to a further alternative embodiment of the present invention.

However, the present invention is not limited thereto and the first wiring connection portion 146 and the first pad portion 162 can have various other shapes according to desired properties. These various examples will be described below with reference to FIGS. 6 and 7. FIGS. 6 and 7 are plan views showing various examples of the wiring connection portion and the pad portion in the conductive film according to embodiments of the present invention, and show a portion corresponding to the enlarged portions of FIG. 1.

Referring to FIG. 6, in the present alternative embodiment, the first pad portion 162 may have a greater area than the first wiring connection portion 146. For example, the drawing illustrates that the first wiring connection portion 146 has a shape corresponding to a half of the first sensor portion 142, i.e. an approximately trapezoidal shape or equilateral triangular shape, whereas the first pad portion 162 has a greater area than the first wiring connection portion 146 and has an approximately octagonal shape such that the entire wiring connection portion 146 overlaps the first pad portion 162. Thereby, the first pad portion 162 having an increased area may achieve reduced resistance In addition, consequently, improved electrical connection with the first wiring connection portion 146.

Referring to FIG. 7, in the present alternative embodiment, grooves 146a may be formed in the first wiring connection portion 146. In this instance, the grooves 146a are indented from at least one edge of the first wiring connection portion 146 when viewed in plan. Specifically, when viewed in plan, the grooves 146a of the first wiring connection portion 146 are positioned to overlap the first pad portion 162 and positioned to be connected to the perforations 18a. Thereby, upon formation of the first pad portion 162, the first pad portion 162 can sequentially fill the perforations 18a and the grooves 146a, which may increase a contact area of the first wiring connection portion 146 and the first pad portion 162. In this way, stronger electrical connection between the first pad portion 162 and the first wiring connection portion 146 may be accomplished.

Although the drawing illustrates the first pad portion 162 as having a greater area than the first wiring connection portion 146, the present invention is not limited thereto and various other alterations are possible.

Referring again to FIGS. 1 and 2, the first wiring connection portions 146, connected to the first pad portions 162, may have a relatively small width and an elongated shape so as to extend to the first flexible printed circuit board 19.

The first wiring electrode 16 may be formed by any of various methods. For example, the first wiring electrode 16 may be formed by applying conductive paste via, e.g., various coating methods, and curing the paste via thermal treatment or firing. The first wiring electrode 16 may be formed of a metal to achieve high electrical conductivity. For example, the first wiring electrode 16 may be formed of conductive paste containing conductive powder, such as silver (Ag) powder or the like. However, the present invention is not limited thereto and the first wiring electrode 16 may have any of various other shapes and be formed of any of various other conductive materials.

The above-described first conductive film 10 may be formed by the following method. First, the first sensor electrode 14 is formed by applying a mixture of the nanomaterial conductors 14a, a solvent, a binder and the like to the entire first base film 12, drying and/or thermally treating the mixture, and patterning the mixture via wet etching, laser etching or the like. In this instance, upon etching, all of the conductors 14a, the residual portion 14b and the first over-coating layer 18 may be removed in a predetermined region. Alternatively, upon etching, only the conductors 14a may be selectively removed from a predetermined region such that the predetermined region has voids corresponding to the conductors 14a and thus prevents flow of electric current. Then, the first over-coating layer 18 is formed on the first sensor electrode 14. However, the present invention is not limited thereto and patterning with regard to the first sensor electrode 14 may be performed after formation of the first over-coating layer 18. Various other alterations are also possible.

Then, the recesses 180, such as the perforations 18a, the thin film portions 18b or the like, are formed by positioning the pressure tool 40 shown in FIG. 3 on the first over-coating layer 18 at a position corresponding to the first wiring connection portion 146 of the first sensor electrode 14 in the non-active area NA and applying pressure to the first over-coating layer 18 using the pressure pieces 42 to cause damage to or breakage of the first over-coating layer 18. Subsequently, conductive paste, which will form the first wiring electrode 16, is applied into the form of the first wiring electrode 16 and drying and/or firing of the applied conductive paste is performed to form the first wiring electrode 16. In this instance, the conductive paste, used to form the first wiring electrode 16, is cured while filling the recesses 180, such as the perforations 18a, the thin film portions 18b or the like. This manufacturing method is merely given by way of example and the present invention is not limited thereto.

The drawing illustrates that the first wiring electrode 16 is located at both ends of the first sensor electrode 14 to achieve a double routing structure. This serves to reduce resistance of the first sensor electrode 14 having a relatively long length, thereby preventing any loss due to resistance. However, the present invention is not limited thereto, and any of various other structures, for example, a single routing structure in which the first wiring electrode 16 is connected to only one side of the first sensor electrode 14, is possible.

In addition, the drawing illustrates that the first wiring electrode 16 is connected to any external component via two non-active areas NA located at both sides of the active area AA. However, the present invention is not limited thereto and the first wiring electrode 16 may be connected to the external component via one non-active area NA located at one side of the active area AA, or may extend to any one of upper and lower sides of the active area AA so as to be connected to the external component via the corresponding side of the active area AA. Various other alterations are also possible.

The first wiring electrode 16 may be connected to the first flexible printed circuit board 19 for external connection. The first flexible printed circuit board 19 may include a base member and a wiring formed on the base member. As the wiring of the first flexible printed circuit board 19 comes into contact with the first wiring electrode 16, the first wiring electrode 16 and the first flexible printed circuit board 19 may be electrically connected to each other. However, the present invention is not limited thereto and a conductive adhesive member, such as an anisotropic conductive adhesive (ACA), anisotropic conductive paste (ACP), an anisotropic conductive film (ACF) or the like, may be located between the wiring of the first flexible printed circuit board 19 and the first wiring electrode 16 to achieve electrical connection therebetween.

The second conductive film 20 includes the second base member 22, the second sensor electrode 24 formed on the second base member 22, a second over-coating layer 28 covering the second sensor electrode 24, and the second wiring electrode 26 formed on the second over-coating layer 28 and electrically connected to the second sensor electrode 24 in the non-active area NA.

The second sensor electrode 24, which is formed on the second base member 22, may include second sensor portions 242 and second connection portions 244 respectively connecting the neighboring second sensor portions 242 to each other, the second sensor portions 242 and the second connection portions 244 being arranged in the active area AA, and second wiring connection portions 246 extending from the second sensor portions 242 or the second connection portions 244 located in the active area AA so as to be located in the non-active area NA. The second over-coating layer 28 is configured to cover the second sensor electrode 24, and the second wiring electrode 26 is formed on the second over-coating layer 28 in the non-active area NA so as to be connected to the second wiring connection portions 246. More specifically, the second wiring electrode 26 includes second pad portions 262 stacked on the second wiring connection portions 246 with the second over-coating layer 28 interposed therebetween so as to be electrically connected to the second wiring connection portions 246, and second wiring portions 264 extending outward from the second pad portions 262.

The second sensor portions 242 are arranged at positions where the first sensor portions 142 are not located, and the second connection portions 244 extend in a second direction (a vertical direction of the drawing) crossing the first sensor electrode 14 to connect the second sensor portions 242 to one another. The drawing illustrates that the second wiring electrode 26 is located at the lower side of the second sensor electrode 24 to achieve a single routing structure. As such, the second wiring electrode 26 is formed in the non-active area NA located at the lower side of the active area AA. However, the present invention is not limited thereto and the second wiring electrode 24 may be located at one or more sides among upper, lower, left and right sides of the active area AA, and various other alterations are possible.

The second over-coating layer 28 may include first portions located between the second wiring connection portions 246 and the second pad portions 262 and second portions except for the first portions. Each of the first portions may be provided with recesses 280, such as perforations 28a, thin film portions or the like.

A description of the first conductive film 10 may be directly applied to the second conductive film 20 except for an extension direction of the second sensor electrode 24, a position of the second wiring electrode 26 in plan and the like. That is, a description of the first base member 12 may be directly applied to the second base member 22, and a description of the first sensor electrode 14 may be directly applied to the second sensor electrode 24. A description of the first over-coating layer 18 and the recesses 180, such as the perforations 18a or the thin film portions 18b, formed in the first over-coating layer 18 may be directly applied to the second over-coating layer 28 and the recesses 280, such as the perforations 28a or thin film portions, formed in the second over-coating layer 28. A description of the first wiring electrode 16 may be directly applied to the second wiring electrode 26. In addition, a description of the method of manufacturing the first conductive film 10 may be directly applied to a method of manufacturing the second conductive film 20.

The second wiring electrode 26 may be connected to the second flexible printed circuit board 29 for external connection. A description of the first flexible printed circuit board 19 may be directly applied to the second flexible printed circuit board 29 and thus, a detailed description thereof will be omitted.

In the drawings and the above description, for clear and brief description, the first conductive film 10 has been described and illustrated as including the first base member 12, the first sensor electrode 14, the first over-coating layer 18 and the first wiring electrode 16 and the second conductive film 20 has been described and illustrated as including the second base member 22, the second sensor electrode 24, the second over-coating layer 28 and the second wiring electrode 26. However, the present invention is not limited thereto. Thus, the first and second conductive films 10 and 20 may respectively further include a protective hard coating layer, an adhesive layer to enhance adhesion between layers stacked one above another, a primer layer and the like. Various other structures may also be applied to the first and second conductive films 10 and 20.

The touch panel 100 may be manufactured by bonding the first conductive film 10 and the second conductive film 20 as described above to the cover substrate 30 using the first and second transparent adhesive layers 42 and 44. In the touch panel 100 having the above-described configuration, when an input device or the user's finger touches the first and second sensor electrodes 14 and 24, a capacitance difference may occur at a location where the input device touches, and the location where the capacitance difference occurs may be detected as a touch location.

In the touch panel 100 or the conductive films 10 and 20 used therein according to the present embodiment, the sensor electrode 14 and 24 may achieve various improved properties owing to the nano-material conductors 14a having a network structure included therein. In addition, by covering the sensor electrodes 14 and 24 with the over-coating layers 18 and 28, it is possible to prevent, for example, physical damage to or oxidation of the sensor electrodes 14 and 24, which may result in improved properties of the sensor electrodes 14 and 24. In this instance, the first portions 181 of the over-coating layers 18 and 28 for connection between the sensor electrodes 14 and 24 and the wiring electrodes 16 and 26 are provided with the recesses 180 and 280 to improve electrical connection between the sensor electrodes 14 and 24 and the wiring electrodes 16 and 26 while maintaining effects by the over-coating layers 18 and 28. In this way, the conductive films 10 and 20, which include the sensor electrodes 14 and 24 provided with the nano-material conductors 14*a* having a network structure, may improve resistance uniformity of the sensor electrodes 14 and 24 and the wiring electrodes 16 and 26 and achieve improved electrical connection between the sensor electrodes 14 and 24 and the wiring electrodes 16 and 26.

Hereinafter, touch panels and conductive films according to other embodiments of the present invention will be described in detail. A detailed description of the same or similar parts to those of the above description will be omitted and only different parts will be described below in detail. The above-described embodiments, alternative embodiments that may be applied thereto, the following embodiments and alternative embodiments that may be applied thereto may be combined in various ways.

Figure 8:
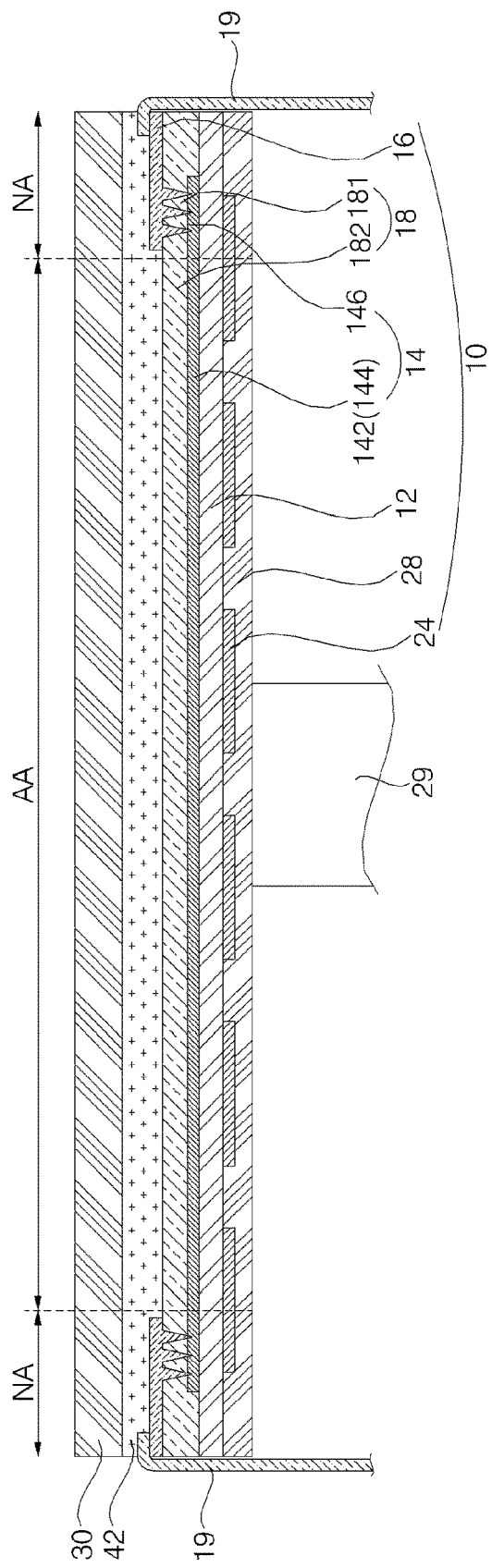
FIG. 8 is a sectional view showing a touch panel according to another embodiment of the present invention.

FIG. 8 is a sectional view showing a touch panel according to another embodiment of the present invention. Referring to FIG. 8, the touch panel according to the present embodiment includes the cover substrate 30, the first transparent adhesive layer 42 disposed on the cover substrate 10, and the first conductive film 10 disposed on the first transparent adhesive layer 42, the first conductive film 10 being provided at one surface thereof with the first sensor electrode 14, the first over-coating layer 18, and the first wiring electrode 16 and at the other surface thereof with the second sensor electrode 24, the second over-coating layer 28 and the second wiring electrode (see reference numeral 26 of FIG. 1). That is, in the present embodiment, the first and second sensor electrodes 14 and 24, which are two electrodes included in the touch panel, may be located at different surfaces of the first base member 12, and the first and second wiring electrodes 16 and 26, which are connected respectively to the first and second sensor electrodes 14 and 24, are located at different surfaces of the first base member 12. With this configuration, the touch panel may achieve a simplified structure and may be reduced in thickness owing to reduction in the number of base members that are elements having the greatest thickness.

Figure 9:
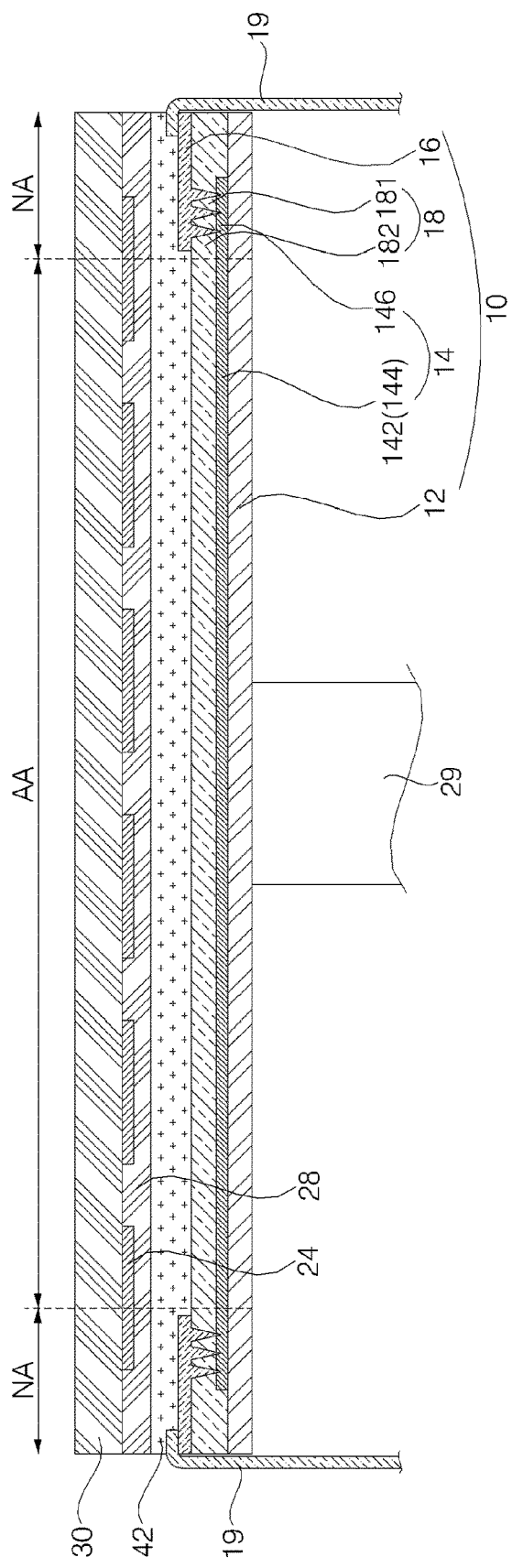
FIG. 9 is a sectional view showing a touch panel according to still another embodiment of the present invention.

FIG. 9 is a sectional view showing a touch panel according to still another embodiment of the present invention. Referring to FIG. 9, the touch panel according to the present embodiment includes the cover substrate 30 provided with the second sensor electrode 24, the second over-coating layer 28 and the second wiring electrode (see reference numeral 26 of FIG. 1), the first transparent adhesive layer 42 disposed on the cover substrate 30 to cover the second sensor electrode 24, and the first conductive film 10 disposed on the first transparent adhesive layer 42 and provided with the first sensor electrode 14, the first over-coating layer 18 and the first wiring electrode 16. In the present embodiment, as a result of the second sensor electrode 24 and the like being formed on the cover substrate 30, the touch panel may achieve a simplified structure and a minimized thickness.

In this instance, the second sensor electrode 24 may be formed of the same material as or different material from the first sensor electrode 14. For example, when the second sensor electrode 24 is formed of indium tin oxide, the second sensor electrode 24 may be easily formed on the cover substrate 30. The second sensor electrode 24 formed of indium tin oxide may eliminate requirement for the second over-coating layer 28. A resistance difference and the like due to different materials of the first sensor electrode 14 and the second sensor electrode 24 may be uniformalized by adjusting thicknesses and the like of the first sensor electrode 14 and the second sensor electrode 24. Alternatively, when the touch panel has a difference between a horizontal length and a vertical length thereof, the first sensor electrode 14 having a relatively low resistance may be an electrode located in the long axis and the second sensor electrode 24 having a relatively high resistance may be an electrode located in the short axis. Various other alterations are also possible.

Figure 10:
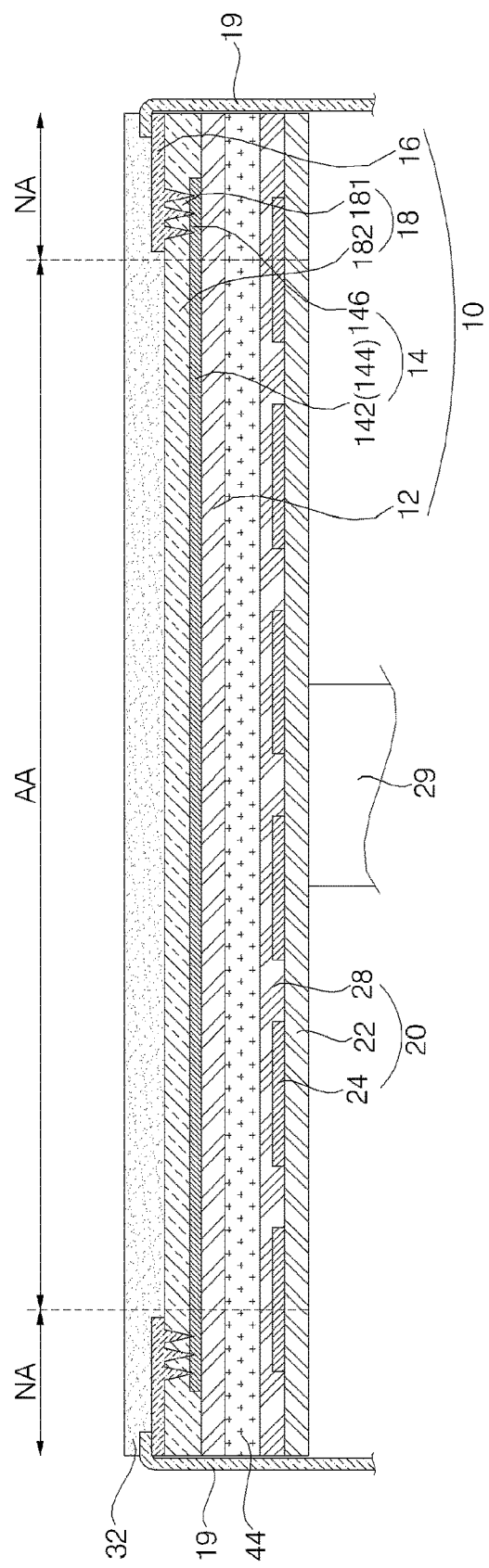
FIG. 10 is a sectional view showing a touch panel according to a further embodiment of the present invention.

FIG. 10 is a sectional view showing a touch panel according to a further embodiment of the present invention. Referring to FIG. 10, in the present embodiment, the cover substrate 30 and the first transparent adhesive layer 42 are omitted, and a hard coating layer 32 is disposed on a front surface of the first conductive film 10. The hard coating layer 32 may be formed of acryl resin, for example. Through omission of the cover substrate 30 and the first transparent adhesive layer 42, the touch panel achieves a reduced cost and a reduced thickness.

The touch panel 100 as described above can be applied to various electronic apparatuses, more particularly, display apparatuses to enable touch operation of the display apparatuses. For example, the touch panel 100 can be applied to televisions that mainly function to display images, be applied to screens of mobile phones, tablets, notebooks, watches and the like that perform an image display function as well as other functions, or be applied to display screens of home appliances, such as refrigerators, washing machines, water purifiers and the like, that achieve improved performance when an image display function is added thereto, although the image display function is not a main function thereof. In this way, the touch panel 100 serves to improve operation convenience of the display apparatuses.

Figure 11:
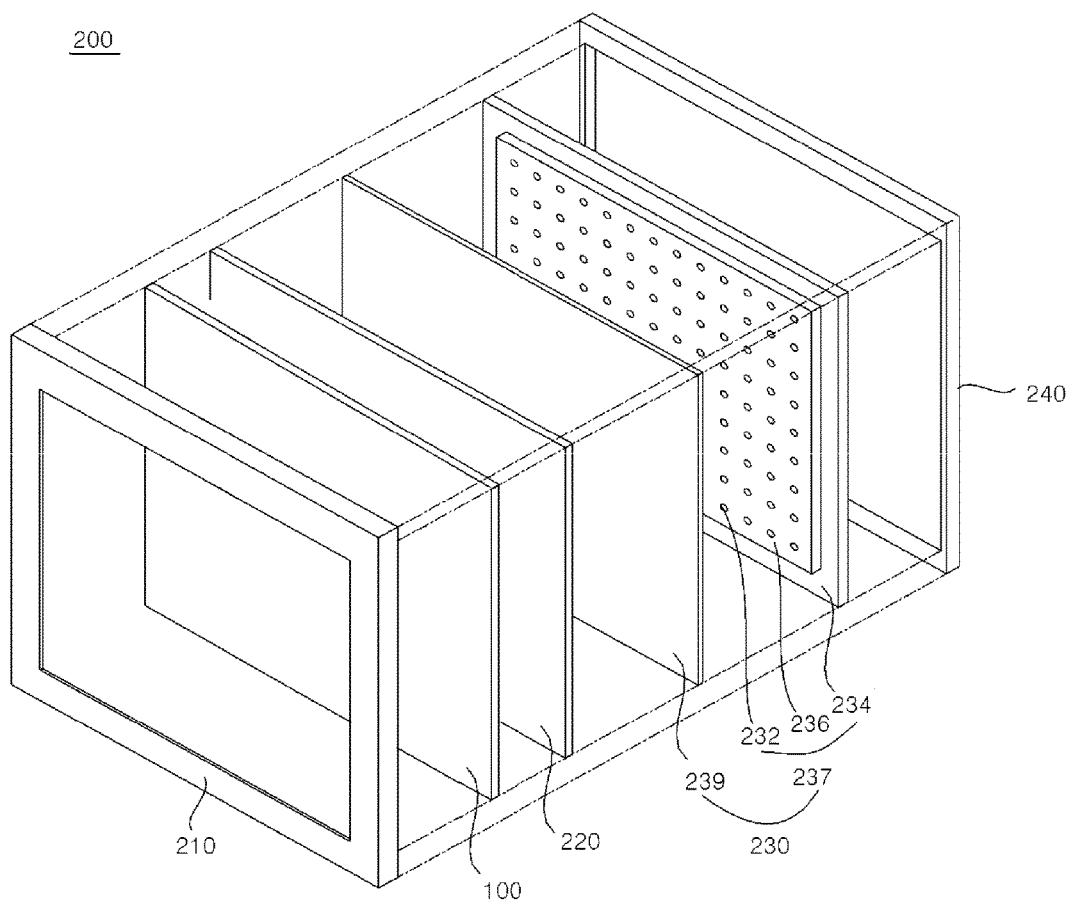
FIG. 11 is a schematic perspective view showing a display apparatus according to an embodiment.

Hereinafter, one example of a display apparatus 200 to which the touch panel 100 according to various embodiments of the present invention may be applied will be described with reference to FIG. 11. The illustration and description of the display apparatus 200 with reference to FIG. 11 are merely given by way of example and the present invention is not limited thereto. In addition, in FIG. 11, for brief and clear description, illustration of parts not directly related to the present invention will be omitted and the display apparatus 200 is schematically illustrated.

FIG. 11 is a schematic perspective view showing a display apparatus according to an embodiment of the present invention. Referring to FIG. 11, the display apparatus, designated by reference numeral 200, includes a frame 210, the touch panel 100, a display panel 220, a backlight unit 230, and a rear cover 240.

The frame 210 and the rear cover 240 serve not only to accommodate internal components, such as the touch panel 100, the display panel 220 and the backlight unit 230, therein, but also to stably secure these components. The present embodiment illustrates that the frame 210 and the rear cover 240 are provided to accommodate and secure the touch panel 100, the display panel 220 and the backlight unit 230, although the present invention is not limited thereto. Instead of the frame 210 and the rear cover 240, various other known structures capable of accommodating and securing the touch panel 100, the display panel 220 and the backlight unit 230 may be applied to the present invention. In particular, a structure to secure the touch panel 100, the display panel 220 and the backlight unit 230 may be altered in various ways according to an application field of the touch panel 100.

The touch panel 100 may be a touch panel including the conductive film as described above with reference to FIGS. 1 to 10. The display panel 220, which is located at the rear of the touch panel 100 to display an image, may be selected from among various known types of display panels. For example, the present embodiment illustrates that the display panel 220 is a liquid crystal display panel. Since the liquid crystal display panel has no self-illumination function, the backlight unit 230 is provided to emit light to the display panel 220.

The backlight unit 230 may include a light emitting unit 237 having light emitting elements 232 to emit light and a diffuser 239 to uniformly diffuse light emitted from the light emitting elements 232.

The present embodiment illustrates a vertical type structure in which the light emitting elements 232 are distributed in a plane. The light emitting unit 237 of the vertical type structure may include the light emitting elements 232 to emit light, a circuit board 234 to which the light emitting elements 232 are secured, and a reflector 236 having holes for insertion of the light emitting elements 232, although the present invention is not limited thereto. Thus, for example, the light emitting unit 237 may have an edge type structure in which the light emitting elements 232 are located close to a side surface. In the edge type structure, for example, a light guide plate for diffusion of light may be provided along with the light emitting elements 232. Various known technologies with regard to the edge type structure may be applied.

The light emitting elements 232 are point light sources and, for example, may be light emitting diodes (LEDs). LEDs have a long lifespan and low power consumption, may be reduced in size and may be eco-friendly. However, the present invention is not limited thereto and various other light emitting elements to emit light based on various other principles and methods may be used. In addition, a shape of the light emitting elements 232 may be altered in various ways to linear light sources, planar light sources and the like.

The light emitting elements 232 may be spaced apart from one another by a prescribed distance and secured to the circuit board 234. The circuit board 234 may have a circuit pattern to provide power required to assist the light emitting elements 232 in emitting light. The circuit board 234 may be a printed circuit board (PCB). Alternatively, the circuit board 234 may be a metal printed circuit board (MPBC) provided at a lower surface thereof with a metal layer (for example, an aluminum layer) to externally radiate heat generated from the light emitting elements 232.

The reflector 236 is secured to the circuit board 234 such that the light emitting elements 232 secured to the circuit board 234 are inserted into the holes of the reflector 236. The reflector 236 serves to reflect light emitted from the light emitting elements 232, thereby preventing unnecessary light loss and increasing luminosity. The reflector 236 may be formed of any of various materials capable of reflecting light and, for example, may be formed of a metal.

While the present embodiment illustrates that the light emitting unit 237 is configured such that the light emitting elements 232 arranged on the printed circuit board 234 are inserted into the holes of the reflector 236, the present invention is not limited thereto and the light emitting unit 237 may have any of various other structures.

The diffuser 239 is disposed on the light emitting unit 237 to diffuse light emitted from the light emitting elements 232 and uniformly transmit the light to the display panel 220. Various known structures and types, such as various optical films, light shielding patterns, prism structures and the like, may be applied to the diffuser 239.

In the above description, the display panel 220 has been described as being a liquid crystal display panel by way of example. However, the present invention is not limited thereto, and the display panel 220 may be any of various other panels, such as plasma display panels (PDPs), organic light emitting diode (OLED) display panels and the like. When the display panel 220 is a PDP or OLED display panel, the display panel 220 has a self-illumination function and the backlight unit 230 may be omitted.

The display apparatus 200 may further include various other elements in addition to the touch panel 100, the display panel 220 and the backlight unit 230. For example, a protective film, a glass board or the like may be provided between the frame 210 and the touch panel 100 to protect the touch panel 100, a circuit unit or the like may further be provided to electrically connect the touch panel 100 and the display panel 200 to each other and to drive the display panel 200, and fastening members, adhesive members and the like may further be provided to connect the respective components to one another. Various other alterations are also possible.

The display apparatus 200 according to the present embodiment includes the touch panel 100 having excellent electrical properties as described above, thus achieving excellent touch properties.

The above described features, configurations, effects, and the like are included in at least one of the embodiments of the present invention, and should not be limited to only one embodiment. In addition, the features, configurations, effects, and the like as illustrated in each embodiment may be implemented with regard to other embodiments as they are combined with one another or modified by those skilled in the art. Thus, content related to these combinations and modifications should be construed as including in the scope and spirit of the invention as disclosed in the accompanying claims.

What is claimed is:

1. A conductive film for use in a touch panel, the conductive film comprising:
   a base member having a sensor area and a non-active area defined therein;
   a sensor electrode formed on the base member in the sensor area and the non-active area, the sensor electrode including nano-material conductors defining a network structure;
   an over-coating layer configured to cover the sensor electrode in the sensor area and the non-active area; and
   a wiring electrode formed on the over-coating layer in the non-active area, the wiring electrode including a pad portion electrically connected to the sensor electrode and a wiring portion connected to the pad portion,
   wherein the over-coating layer includes a first portion located between the sensor electrode and the wiring electrode and includes a recess,
   wherein the recess includes a flat portion in the first portion, and a thin film portion having a smaller thickness than the flat portion, the thin film portion being disposed in the first portion,
   wherein the recess has a greater area at a region distant from the base member than an area of a region close to the base member, wherein the recess is disposed in a region overlapping the sensor electrode and the wiring electrode, and wherein the recess includes a lateral surface having a greater surface roughness than a surface roughness of a surface of the over-coating layer.

2. The conductive film according to claim 1, wherein the recess of the first portion includes a plurality of recesses at one first portion.

3. The conductive film according to claim 2, wherein the plurality of recesses of the first portion are 4 to 64 in number at one first portion.

4. The conductive film according to claim 2, wherein the plurality of recesses of the first portion are arranged in a matrix.

5. The conductive film according to claim 1, wherein the recess is gradually increased in size with increasing distance from the base member.

6. The conductive film according to claim 1, wherein the recess has a notch shape.

7. The conductive film according to claim 1, wherein:
the surface roughness of the lateral surface of the recess is 10 nm or more; and
the surface roughness of the surface of the over-coating layer is below 10 nm.

8. The conductive film according to claim 1, wherein:
the sensor electrode includes a plurality of sensor portions, connection portions configured to connect the sensor portions to one another, and a wiring connection portion extending from each of the sensor portions or the connection portions to the non-active area;
the wiring electrode includes the pad portion configured to fill the recess and connected to the wiring connection portion, and the wiring portion connected to the pad portion; and
the recess is located in a zone having an area within a range of 20% to 80% of an area of the wiring connection portion or the pad portion.

9. The conductive film according to claim 1, wherein:
the sensor electrode includes a plurality of sensor portions, connection portions configured to connect the sensor portions to one another, and a wiring connection portion extending from each of the sensor portions or the connection portions to the non-active area;
the wiring electrode includes the pad portion configured to fill the recess and connected to the wiring connection portion and the wiring portion connected to the pad portion;
the recess of the first portion located between the sensor electrode and the wiring electrode includes a plurality of recesses at one first portion; and
the plurality of recesses at the one first portion have a total area within a range of 30% to 50% of an area of a zone provided with the recesses.

10. The conductive film according to claim 1, wherein the recess has a width or diameter within a range of 10 μm to 100 μm.

11. The conductive film according to claim 1, wherein:
the recess of the first portion located between the sensor electrode and the wiring electrode includes a plurality of recesses at one first portion; and
the plurality of recesses at the one first portion are spaced apart from one another by a distance within a range of 0.1 mm to 0.9 mm.

12. A touch panel comprising:
a base member having a sensor area and a non-active area defined therein;
a sensor electrode formed on the base member in the sensor area and the non-active area, the sensor electrode including nano-material conductors defining a network structure;
an over-coating layer configured to cover the sensor electrode in the sensor area and the non-active area;
a wiring electrode formed on the over-coating layer in the non-active area, the wiring electrode including a pad portion electrically connected to the sensor electrode and a wiring portion connected to the pad portion; and
another sensor electrode spaced apart from the sensor electrode and configured extending in a direction crossing the sensor electrode of the conductive film,
wherein the over-coating layer includes a first portion located between the sensor electrode and the wiring electrode and includes a recess,
wherein the recess includes a flat portion in the first portion, and a thin film portion having a smaller thickness than the flat portion, the thin film portion being disposed in the first portion,
wherein the recess has a greater area at a region distant from the base member than an area of a region close to the base member,
wherein the recess is disposed in a region overlapping the sensor electrode and the wiring electrode, and
wherein the recess includes a lateral surface having a greater surface roughness than a surface roughness of a surface of the over-coating layer.

13. A display apparatus comprising:
a touch panel including:
a base member having a sensor area and a non-active area defined therein;
a sensor electrode formed on the base member in the sensor area and the non-active area, the sensor electrode including nano-material conductors defining a network structure;
an over-coating layer configured to cover the sensor electrode in the sensor area and the non-active area;
a wiring electrode formed on the over-coating layer in the non-active area, the wiring electrode including a pad portion electrically connected to the sensor electrode and a wiring portion connected to the pad portion; and
another sensor electrode spaced apart from the sensor electrode and configured extending in a direction crossing the sensor electrode of the conductive film; and
a display panel located at a rear side of the touch panel to display an image,
wherein the over-coating layer includes a first portion located between the sensor electrode and the wiring electrode and includes a recess,
wherein the recess includes a flat portion in the first portion, and a thin film portion having a smaller thickness than the flat portion, the thin film portion being disposed in the first portion,
wherein the recess has a greater area at a region distant from the base member than an area of a region close to the base member,
wherein the recess is disposed in a region overlapping the sensor electrode and the wiring electrode, and
wherein the recess includes a lateral surface having a greater surface roughness than a surface roughness of a surface of the over-coating layer.

* * * * *